United States Patent
Selstad

(10) Patent No.: US 11,313,285 B2
(45) Date of Patent: *Apr. 26, 2022

(54) APPARATUS AND METHOD FOR CONTROLLING AND MONITORING AN ELECTRO-HYDRAULIC SERVOVALVE

(71) Applicant: Raytheon Technologies Corporation, Farmington, CT (US)

(72) Inventor: Tyler J. Selstad, West Hartford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 26 days.

This patent is subject to a terminal disclaimer.

(21) Appl. No.: 16/837,684

(22) Filed: Apr. 1, 2020

(65) Prior Publication Data

US 2020/0224594 A1 Jul. 16, 2020

Related U.S. Application Data

(63) Continuation of application No. 14/920,453, filed on Oct. 22, 2015, now Pat. No. 10,626,803.

(51) Int. Cl.
*F02C 9/26* (2006.01)
*F16K 37/00* (2006.01)
(Continued)

(52) U.S. Cl.
CPC .............. *F02C 9/263* (2013.01); *F02C 7/232* (2013.01); *F02C 9/28* (2013.01); *F16K 37/0075* (2013.01); *F16K 37/0083* (2013.01); *G01M 15/14* (2013.01); *F05D 2260/82* (2013.01); *F05D 2260/83* (2013.01); *F05D 2270/708* (2013.01)

(58) Field of Classification Search
CPC .. F02C 7/232; F02C 9/28; F02C 9/263; F16K 37/0075; F16K 37/0083; G01M 15/14; G05B 9/02; G05B 7/02; F05D 2260/82; F05D 2260/83; F05D 2270/708
See application file for complete search history.

(56) References Cited

U.S. PATENT DOCUMENTS 3,748,897 A  7/1973  Rabinowitz
4,276,744 A * 7/1981  Pisano ............... F02C 9/28
                                              60/791

(Continued)

OTHER PUBLICATIONS

European Search Report for Application No. EP 16 19 5229.

*Primary Examiner* — Alain Chau
(74) *Attorney, Agent, or Firm* — Cantor Colburn LLP

(57) ABSTRACT

A method for actively calculating a capability of an electronically controlled valve is provided. The method including the steps of: a) operating the electronically controlled valve in accordance with a task; b) testing the electronically controlled valve in order to determine a range of movement of the electronically controlled valve in accordance with an initial gain, wherein the testing of the electronically controlled valve occurs after the valve has been operated in accordance with the task; c) determining a new gain required for providing a predetermined range of movement of the electronically controlled valve; and d) repeating steps a-c at least once, wherein the new gain is used to operate the valve in accordance with the task.

17 Claims, 3 Drawing Sheets

(51) Int. Cl.
 *F02C 9/28* (2006.01)
 *G01M 15/14* (2006.01)
 *F02C 7/232* (2006.01)

(56) References Cited

U.S. PATENT DOCUMENTS

| | | | | |
|---|---|---|---|---|
| 4,411,595 | A * | 10/1983 | Pisano | F02C 9/28 416/1 |
| 4,523,286 | A | 6/1985 | Koga et al. | |
| 4,566,310 | A * | 1/1986 | Cohen | F16K 37/0083 73/168 |
| 4,648,580 | A | 3/1987 | Kuwano et al. | |
| 5,233,512 | A | 8/1993 | Gutz et al. | |
| 5,486,997 | A | 1/1996 | Reismiller et al. | |
| 6,192,321 | B1 * | 2/2001 | Grumstrup | F16K 37/0083 702/113 |
| 6,389,816 | B1 * | 5/2002 | McCarty | F02C 9/28 60/773 |
| 7,475,537 | B2 | 1/2009 | Spickard | |
| 8,317,156 | B2 * | 11/2012 | Singh | G05B 9/02 251/129.04 |
| 9,021,870 | B2 | 5/2015 | Gueit | |
| 2007/0057216 | A1 * | 3/2007 | Hoffmann | F16K 37/0083 251/129.04 |
| 2009/0306830 | A1 | 12/2009 | Cummings | |
| 2010/0280731 | A1 * | 11/2010 | Snider | F02C 9/40 701/100 |
| 2010/0288364 | A1 | 11/2010 | Singh et al. | |
| 2011/0000287 | A1 | 1/2011 | Bacic | |
| 2012/0130587 | A1 | 5/2012 | Chapski | |
| 2013/0133306 | A1 | 5/2013 | Qiu et al. | |
| 2013/0139520 | A1 | 6/2013 | Masse et al. | |
| 2014/0000352 | A1 | 1/2014 | Gueit | |

\* cited by examiner

APPARATUS AND METHOD FOR CONTROLLING AND MONITORING AN ELECTRO-HYDRAULIC SERVOVALVE

CROSS REFERENCE TO RELATED APPLICATIONS

This application is a continuation of U.S. patent application Ser. No. 14/920,453 filed on Oct. 22, 2015, the entire contents of which are incorporated herein by reference thereto.

BACKGROUND

This disclosure relates to electro-hydraulic servovalves (EHSVs) and an apparatus and method for controlling and/or monitoring such valves.

Electro-hydraulic servovalves (EHSVs) are used with many position control systems. An EHSV converts a low energy signal level command from a controller into a high energy hydraulic command. This hydraulic command is used to position mechanical components.

The use of high temperature fuels in gas turbine engines has created potential issues with valves and/or actuators being subjected to fuel lacquering and coking of their fine screens. Additionally, long term exposure to contamination and higher flow rates can potentially result in servovalve erosion which can cause problems in control loop design as well.

Accordingly, it is desirable to provide an apparatus and method for predicting trends or potential problems in the valve or actuator.

BRIEF DESCRIPTION

In one embodiment, a method for actively calculating a capability of an electronically controlled valve is provided. The method including the steps of: a) operating the electronically controlled valve in accordance with a task; b) testing the electronically controlled valve in order to determine a range of movement of the electronically controlled valve in accordance with an initial gain, wherein the testing of the electronically controlled valve occurs after the valve has been operated in accordance with the task; c) determining a new gain required for providing a predetermined range of movement of the electronically controlled valve; and d) repeating steps a-c at least once, wherein the new gain is used to operate the valve in accordance with the task.

In addition to one or more of the features described above, or as an alternative to any of the foregoing embodiments, the task may be controlling an amount of fuel provided to a gas turbine engine.

In addition to one or more of the features described above, or as an alternative to any of the foregoing embodiments, the electronically controlled valve may be a fuel valve of a gas turbine engine.

In addition to one or more of the features described above, or as an alternative to any of the foregoing embodiments, the new gain may be an average of a plurality of gains each being a result of one of a plurality of tests of the electronically controlled valve, wherein each one of the plurality of tests determines a range of movement of the electronically controlled valve in accordance with the initial gain, wherein each one of the plurality of tests occurs after the valve has been operated in accordance with the task.

In addition to one or more of the features described above, or as an alternative to any of the foregoing embodiments, the method further comprising: recording an initial gain required for providing the predetermined range of movement of the electronically controlled valve.

In addition to one or more of the features described above, or as an alternative to any of the foregoing embodiments, the electronically controlled valve may be a fuel valve of a gas turbine engine.

In addition to one or more of the features described above, or as an alternative to any of the foregoing embodiments, each new gain may be compared to a predetermined value in order to determine whether the valve is trending towards a threshold value.

In addition to one or more of the features described above, or as an alternative to any of the foregoing embodiments, the threshold value may be a speed of the valve that is indicative of a repair.

In addition to one or more of the features described above, or as an alternative to any of the foregoing embodiments, the initial gain may be in mA/inch and is applied to a control loop of the electronically controlled valve.

In another embodiment, a system for actively calculating a capability of an electronically controlled valve, the system having: an engine electronic control; an initial gain that provides a range of movement of the electronically controlled valve when the initial gain is provided to the electronically controlled valve by the engine electronic control; and wherein the engine electronic control is configured to: i) operate the electronically controlled valve in accordance with a task; ii) test the electronically controlled valve in order to determine a range of movement of the electronically controlled valve in accordance with the initial gain, wherein the testing of the electronically controlled valve occurs after the valve has been operated in accordance with the task; iii) determine a new gain required for providing the predetermined range of movement of the electronically controlled valve; and iv) repeat steps i-iii at least once, wherein the new gain is used to operate the valve in accordance with the task.

In addition to one or more of the features described above, or as an alternative to any of the foregoing embodiments, the task may be controlling an amount of fuel provided to a gas turbine engine.

In addition to one or more of the features described above, or as an alternative to any of the foregoing embodiments, the electronically controlled valve may be a fuel valve of a gas turbine engine.

In addition to one or more of the features described above, or as an alternative to any of the foregoing embodiments, the new gain may be an average of a plurality of gains each being a result of one of a plurality of tests of the electronically controlled valve, wherein each one of the plurality of tests determines a range of movement of the electronically controlled valve in accordance with the initial gain, wherein each one of the plurality of tests occurs after the valve has been operated in accordance with the task.

In addition to one or more of the features described above, or as an alternative to any of the foregoing embodiments, the task may be controlling an amount of fuel provided to a gas turbine engine.

In addition to one or more of the features described above, or as an alternative to any of the foregoing embodiments, the electronically controlled valve may be a fuel valve of a gas turbine engine.

In addition to one or more of the features described above, or as an alternative to any of the foregoing embodiments, the new gain may be compared to a predetermined value in order to determine whether the valve is trending towards a threshold value.

In addition to one or more of the features described above, or as an alternative to any of the foregoing embodiments, the threshold value is a speed of the valve that is indicative of a repair.

In addition to one or more of the features described above, or as an alternative to any of the foregoing embodiments, the initial gain may be in mA/inch and is applied to a control loop of the electronically controlled valve.

In yet another embodiment, a method for predicting a trend of an electronically controlled valve is provided. The method including the steps of: a) recording an initial gain required for providing a predetermined range of movement of the electronically controlled valve; b) operating the electronically controlled valve in accordance with a task; c) testing the electronically controlled valve in order to determine a range of movement of the electronically controlled valve in accordance with the initial gain, wherein the testing of the electronically controlled valve occurs after the valve has been operated in accordance with the task; d) determining a new gain required for providing the predetermined range of movement of the electronically controlled valve; e) comparing the new gain to a threshold value to determine whether the new gain is greater than the threshold value; and f) repeating steps b-e at least once, wherein the new gain is used to operate the valve in accordance with the task.

In addition to one or more of the features described above, or as an alternative to any of the foregoing embodiments, the initial gain may be in mA/inch and is applied to a control loop of the electronically controlled valve and wherein the task is controlling an amount of fuel provided to a gas turbine engine and wherein the electronically controlled valve is a fuel valve of the gas turbine engine.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

Figure 1:
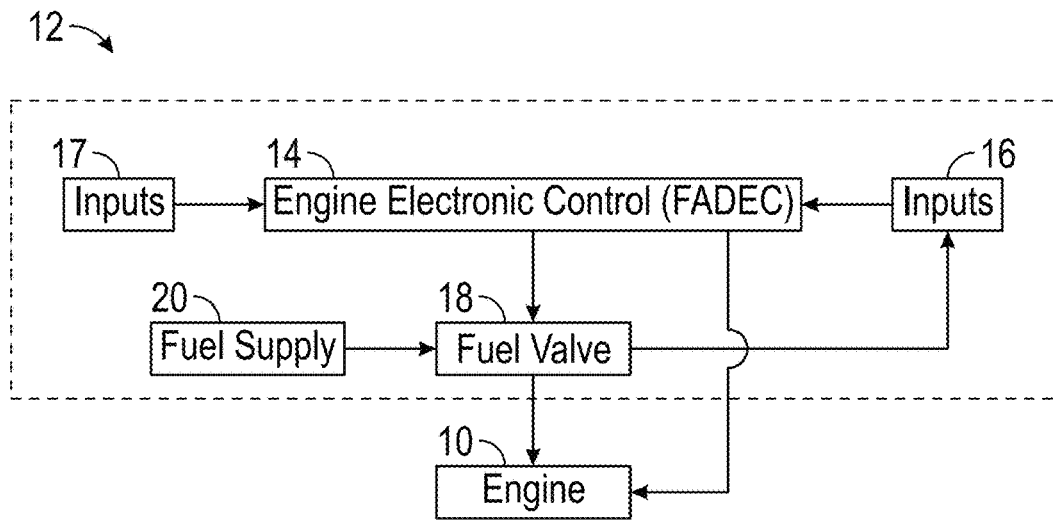
FIG. 1 is a schematic illustration of a system for controlling the operation of an electro-hydraulic servovalve(s) in accordance with an embodiment of the disclosure.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present disclosure may include features and components not specifically shown in the drawings. Like reference numerals identify similar structural elements.

DETAILED DESCRIPTION

Various embodiments of the present disclosure are related to an apparatus and method for adaptively changing an EEC gain of a minorloop (measured in mA/in) in an electronically actuated valve or actuator in order to correct for any flow gain issues as well as providing a means to trend the output of the valve or actuator for lacquering or coking issues as well as servovalve erosion issues.

Due to increased fuel temperatures on certain engine platforms, fuel lacquering and coking of fine screens presents challenges to actuator and valve components. Each actuator or valve typically employs a series of screens across the supply and return flow ports in order to protect the small passageways of the EHSVs from being clogged by debris. When the actuator or valve (EHSV) lacquers or cokes up, the flow gain is reduced and the actuator or valve will start to respond sluggishly. Conversely, window areas of the valve may erode over time due to contamination and/or time of usage. If this occurs, the valve or actuator may respond quicker. Currently, a constant gain for the valve or actuator is used, which is based upon a non-clogged or non-coked up state of the valve or actuator and/or the screens of the valve or actuator as well as a non-eroded valve or actuator. Various embodiments of the disclosure are directed to a method and apparatus to adaptively change the EEC gain of the minorloop (mA/in), in order to correct any flow gain issues experienced during the life of the valve as well as provide a means to trend the output for fuel lacquering or coking issues as well as erosion issues.

Referring now to FIG. 1, a schematic illustration of a gas turbine engine 10 and a system 12 for detecting and controlling an operational state of the gas turbine engine 10 is provided.

The gas turbine engine 10 has among other components a fan through which ambient air is propelled into the engine housing, a compressor for pressurizing the air received from the fan and a combustor wherein the compressed air is mixed with fuel and ignited for generating combustion gases. The gas turbine engine 10 further comprises a turbine section for extracting energy from the combustion gases. Fuel is injected into the combustor of the gas turbine engine 10 for mixing with the compressed air from the compressor and ignition of the resultant mixture.

As illustrated in FIG. 1, the system 12 comprises a Full Authority Digital Engine Control (FADEC) or EEC, or other processor configured to control aspects of an aircraft engine and its performance. The FADEC or EEC is illustrated schematically as item 14. The FADEC or EEC 14 receives multiple input variables including but not limited to air density, throttle lever position, engine temperatures, engine pressures, and many other parameters. These inputs are illustrated schematically as boxes 16, 17.

These inputs are received by the FADEC or EEC and may be analyzed numerous times per second. Engine operating parameters such as fuel flow, stator vane position, bleed valve position, and others are computed from this data and applied as appropriate. The FADEC or EEC also controls engine starting, running, shutdown and restarting. During any of the aforementioned controls the FADEC or EEC may provide commands to one or more fuel valves or actuators 18 that control a supply of fuel 20 to the engine 10. As mentioned above, the valves may be electro-hydraulic servovalves (EHSV) and it is desirable to predict trends or potential problems in a valve or actuator, which may be used to supply fuel to the engine.

Figure 2:
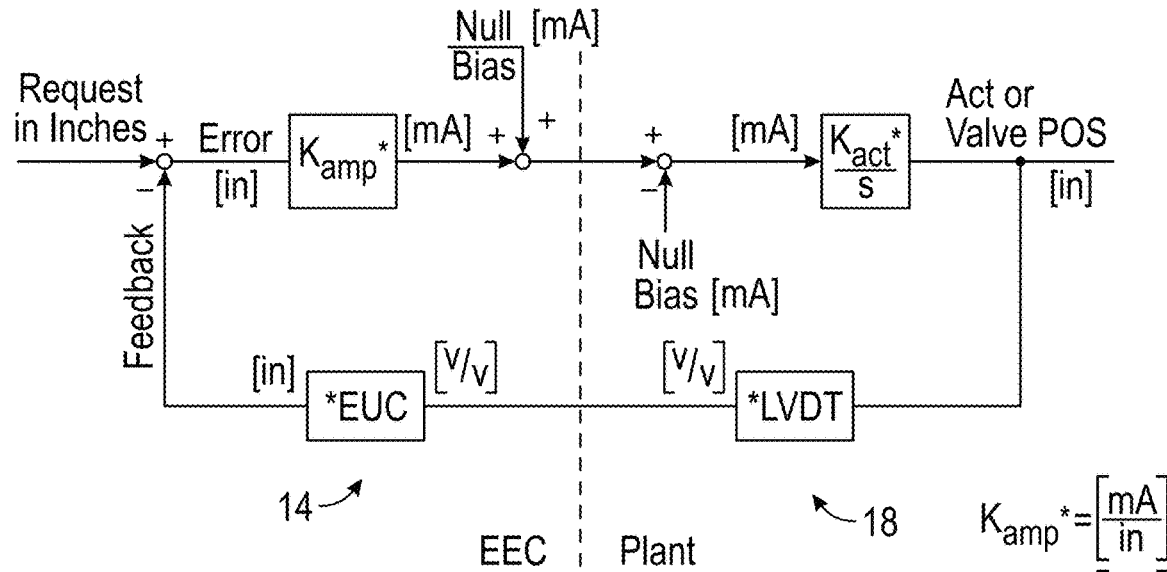
FIG. 2 is a schematic illustration of a minorloop control of an actuator or valve in accordance with an embodiment of the disclosure.

Referring now to FIG. 2, a schematic illustration of a minorloop control or control loop or proportional control loop of an actuator and plant or valve is provided. As is known in the related arts, an electro-hydraulic servovalve (EHSV) is driven by an input position command typically in the form of mA of current. During operation an EHSV accepts a position command in the form of mA of current, which in the illustrated embodiment is provided by the EEC.

As is known in the related arts and referring to at least FIG. 2, at least the following: the request; the engineering units conversion; the error, which is the request minus the feedback; the product of $K_{amp}$ and the error; and any other required step is performed by a processor or equivalent device of the EEC.

For a given example of K bandwidth or $K_{bw}$ that=30 rad/sec we can use the following formula:

$$K_{bw}=K_{amp}*K_{act}=30 \text{ rad/sec}.$$

$K_{amp}$=the proportional gain that the control or EEC provides in milliamps/inch. As shown in at least FIG. 2, $(K_{amp})$(error signal) will provide a product in milliamps that is used to provide a desired movement of the valve. $K_{amp}$ may also be referred to as $K_{eec}$ in either scenario this refers to the gain provided to the valve in order to effectuate movement of the valve. For example and in one non-limiting embodiment, a given error signal with $K_{amp}$ will provide a current from the control loop to the actuator or valve.

$K_{act}$ or $K_{actuator}$=the plant or valve dynamics itself or velocity of the actuator or valve for a given current received from the control loop. An actuator (or hydraulic cylinder with EHSV) can be roughly modeled as an integrator with a gain. $K_{act}$ represents the velocity that can be expected, given a certain current. In various embodiments disclosed herein, the valve has linear variable transformer (LVDT) feedback to the EEC as shown in at least FIG. 2 (the feedback to the EEC is also shown at least by box 16 in FIG. 1) and tests or calculations are run on the EEC to determine what the $K_{act}$ or velocity of the valve or actuator is in (in/sec/mA) by noting the speed and how much current it takes to get that speed (e.g., Actuator Gain (in/sec/mA)). These calculations are performed by a microprocessor or equivalent device of the EEC or in operable communication with the EEC or FADEC as well as the actuator or valve. As shown in at least FIG. 2, the LVDT converts mechanical displacement to an electrical signal, typically a voltage ratio, which is received by the EEC and the EEC performs an Engineering Units Conversion or converts the received electrical signal to inches, which is then provided as a feedback and the EEC can determine if there is an error or difference between the Request in inches for a given $K_{amp}$ and the actual movement of the valve $K_{act}$ in accordance with the request so that $K_{amp}$ can be modified, if necessary, to provide a request movement of the valve or actuator.

Accordingly and in one embodiment, the gain of $K_{amp}$ is a quantity that, coupled with the error, will result in an adaptive current being applied to the electronically controlled valve.

$K_{bw}$=Loop Gain or Bandwidth (rad/sec) of the system. $K_{bw}$ is the product of $K_{act}*K_{amp}$.

In accordance with one non-limiting embodiment, $K_{amp}$ and $K_{act}$ for a given $K_{bw}$ are known. If we know from an initial factory setting that $K_{amp}$=1000 mA/in and $K_{act}$=0.03 in/sec/mA for a $K_{bw}$ of 30 rad/sec, we can determine $K_{act}$ as the valve is used and its performance is recorded/calculated. Recordation and/or calculation of $K_{act}$ of the valve as it is used will allow the EEC to vary $K_{amp}$ in order to maintain the desired valve operation or movement while also predicting trends in the operation of the valve. In this example, $K_{act}$ of 0.03 in/sec/mA would be attributable to a new valve or actuator that does not have coking or servovalve erosion issues that are attributable to operational usage of the valve or actuator. In other words, $K_{act}$=0.03 in/sec/mA is used as the normal or beginning value of a new valve or actuator placed into service and various embodiments of the disclosure adjust $K_{amp}$ such that it maintains a design $K_{bw}$ given the relation: $K_{bw}=K_{amp}*K_{act}$.

If $K_{amp}$ remains constant at 1000 mA/in the bandwidth of the valve 18 will change as $K_{act}$ changes. An example of this is illustrated in the below table in the column identified as without adaptive gain. As used herein $K_{act}$ is attributable to the physical characteristics of the valve 18 or how fast it will go for a given current, which may be attributable to fuel lacquering or coking and/or erosion of the valve or actuator.

| | | | | Without Adaptive Gain | | With Adaptive Gain | |
| --- | --- | --- | --- | --- | --- | --- | --- |
| EHSV Degrade Mechanism | Velocity | $K_{act}$ | $K_{amp}$ Adjusted | Bandwidth $K_{amp}$ remains at 1000 | Stability | Bandwidth $K_{amp}$ Adjusted | Stability |
| valve screens coke or clog | Slower | 0.01 | 3,000 | 10 | Ok | 30 | Ok |
| valve screens coke or clog | Slower | 0.02 | 1,500 | 20 | Ok | 30 | Ok |
| | Nominal | 0.03 | 1,000 | 30 | Ok | 30 | Ok |
| Valve windows erode | Faster | 0.04 | 750 | 40 | Low | 30 | Ok |
| Valve window erode | Faster | 0.05 | 600 | 50 | Lower | 30 | Ok |

Various embodiments of the present disclosure are directed to actively calculating the actual capability of the valve or actuator 18 ($K_{act}$) as shown in at least FIG. 2, such that $K_{amp}$ can be adjusted to maintain the bandwidth of the valve or actuator ($K_{bw}$) within a desired range as well as predict a trend of the valve or actuator.

Figure 3:
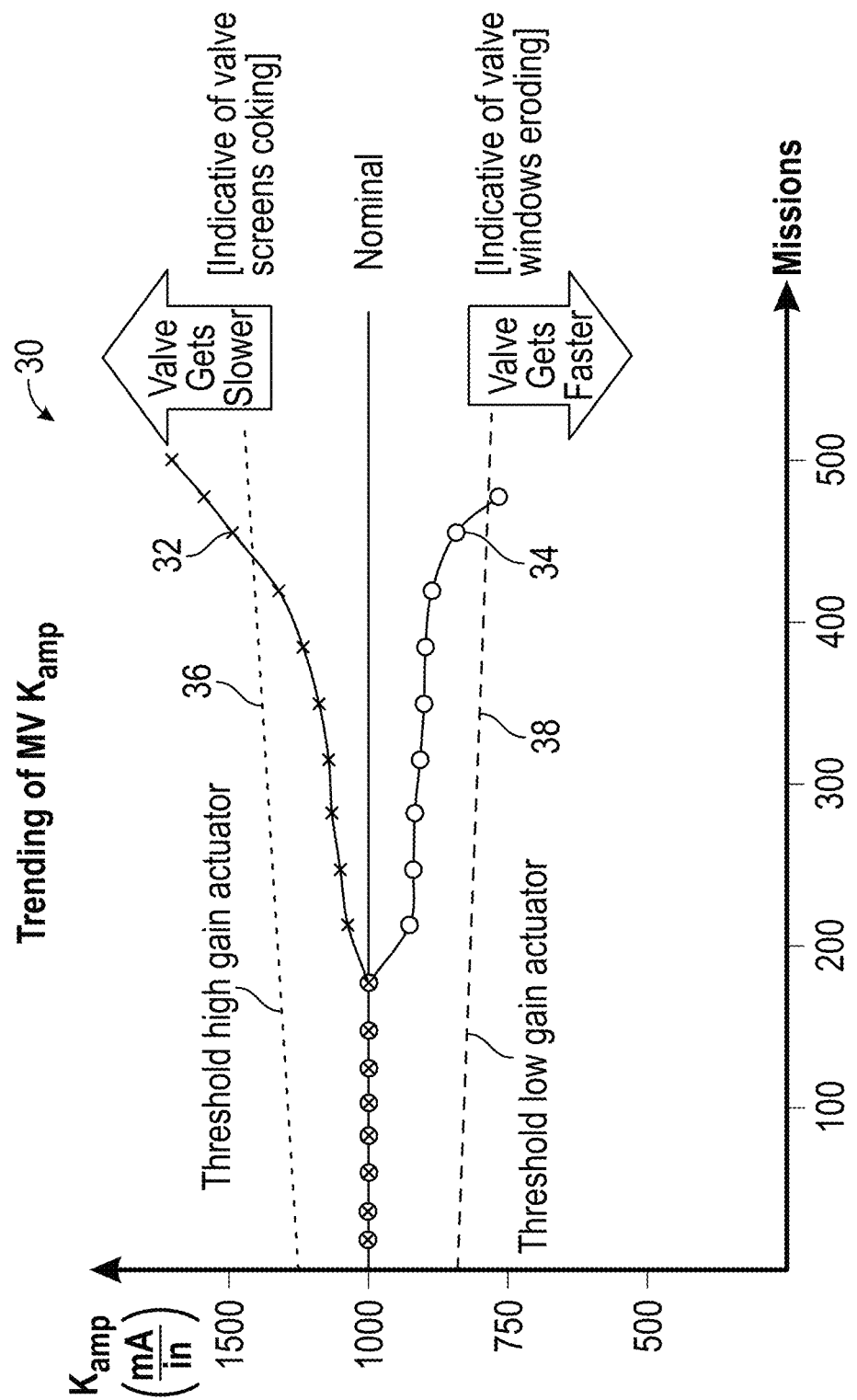
FIG. 3 is a graph illustrating potential trends of $K_{amp}$ of a valve or actuator in accordance with an embodiment of the disclosure.

This provides at least two benefits, by actively calculating the actual capability of the valve or actuator, a means is provided to adaptively adjust the valve EEC gain in order to maintain a constant loop gain or system bandwidth (Kbw=Kact*Kamp). Without adaptive adjustment, a slower valve would exhibit lower bandwidths which could be destabilizing to the outer loop. Also and without adaptive adjustment, a faster valve could produce limit cycles on the minorloop because of a gain mismatch. Accordingly and by adaptively adjusting the valve EEC gain, a constant and consistent minorloop gain is ensured. Another benefit is achieved by calculating a moving-average of the EEC gain, this allows the system to trend the actuator or valve for potential fuel lacquering or coking effects of screens or other devices that could cause sluggish performance in actuator or valve as well as deleterious effects that may cause the valve or actuator to operate faster. See for example, the graph 30 illustrated in FIG. 3. Line 32 illustrates a valve or actuator that is trending to become slower while line 34 illustrates a valve or actuator that is trending to become faster. Also shown are thresholds 36 and 38, which may represent an indication that the valve or actuator 18 should be serviced or replaced. As shown in FIG. 3, the thresholds are illustrated as changing (e.g., increasing in value) with respect to the number of missions, flights or engine cycles as newer valves are expected to have lower tolerances and those tolerances may be expected to have acceptable increases over usage. It is, of course, understood that the thresholds may be alternatively fixed or static with respect to the number of missions, flights or engine cycles such that the lines 36, 38 would not have a slope.

One way to actively calculate the actual capability of the valve or actuator 18 is to leverage built in tests of the metering valve 18, for example, the EEC can be programmed to test the actuator to determine the maximum rate of the valve via an engine shutdown or a specific ground idle test. As such, these tests are performed after the engine has been shut down and/or its associated aircraft has landed. Another method for actively calculating the actual capability of the valve or actuator may involve monitoring of velocity and current to continuously determine the maximum rate of the valve 18. Accordingly and once the max rate of the actuator 18 is determined, it is then used to calculate an effective EEC gain (mA/in) or minorloop gain using a target bandwidth or loop gain (Kbw=Kact*Kamp). By keeping a moving average of the last 20 (for example) tests, this prevents a sudden change of the control gain. The new EEC gain would be then stored in memory such that it could be used in the next power up of the EEC. Of course, the moving average can be more or less than 20 tests.

Figure 4:
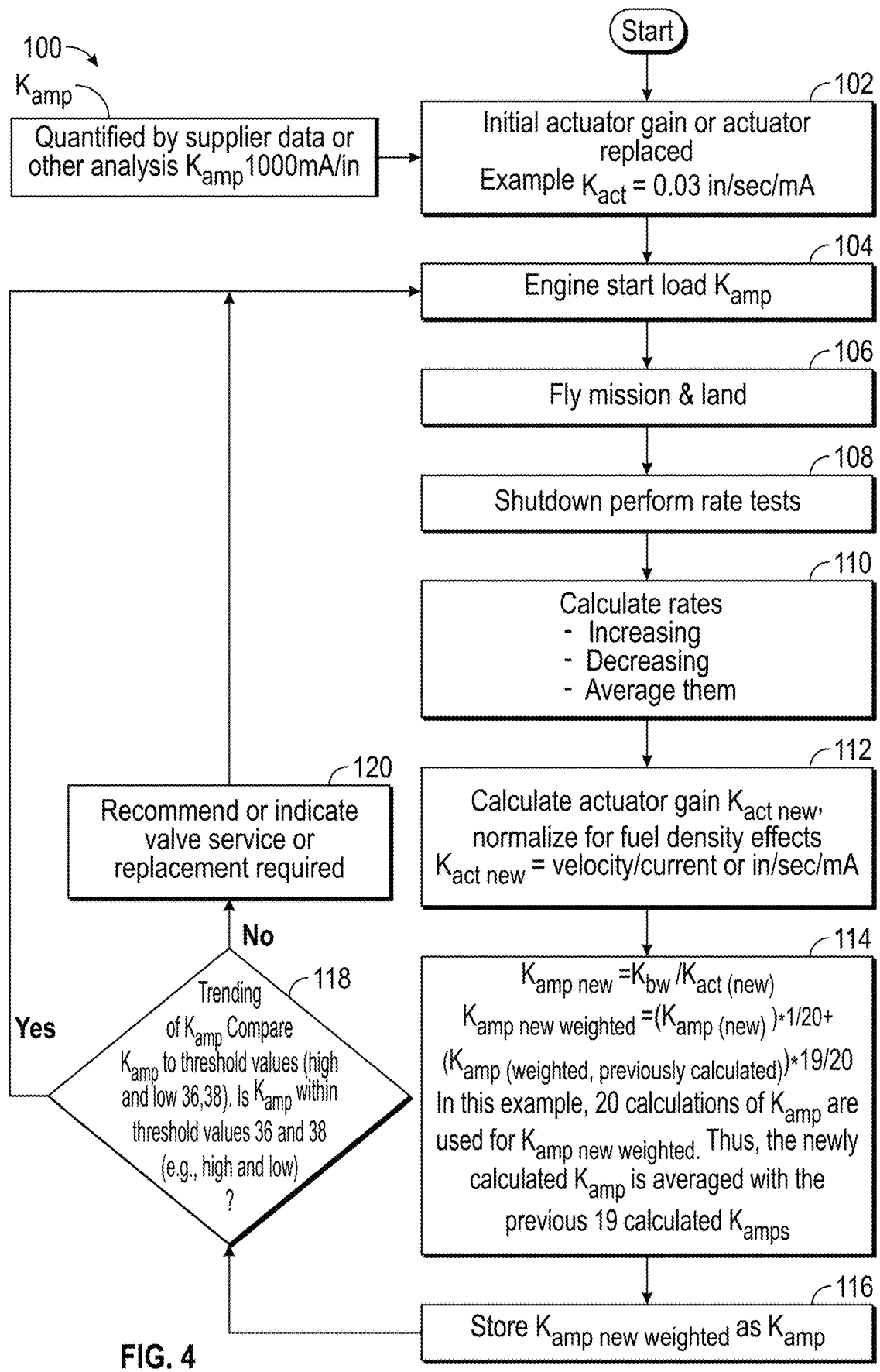
FIG. 4 is a flow chart illustrating a method for varying a gain of a valve in accordance with an embodiment of the disclosure.

For example and referring now to FIG. 4 a flow chart 100 illustrating a method for actively calculating the actual capability of the valve or actuator 18 of the engine 10 is illustrated. At box or step 102, an initial actuator or valve gain $K_{amp}$ is provided. This may be provided by a manufacturer of valve 18 or some other analysis that provides $K_{amp}$ when the valve or actuator 18 is put into service. For example, this may occur when the valve is replaced. Again, one non-limiting example uses $K_{act}$ as 0.03 in/sec/mA. At step 104, the engine is started. In one non-limiting embodiment, the engine may be a gas turbine engine 10 that is used in an aircraft. Still further and in accordance with various embodiments of the present disclosure the method described herein may be a series of executable code resident upon a microprocessor of the FADEC or EEC 14. Once the engine 10 and/or the associated aircraft has completed its flight or mission (box 106) the engine 10 is shut down and a computer program resident upon the FADEC or EEC 14 will perform a rate test to see if the valve or actuator is increasing or decreasing in speed, which may be indicative of the health or operational state of the valve or actuator.

This rate test is illustrated by box or step 108 wherein the rates and fuel temperatures are recorded. At box 110 the plurality of recorded rates are added together and averaged. These recorded rates are normalized for variations in fuel density (e.g., fuel density effects on the recorded rate). Then and at step or box 112, $K_{act\ (new)}$ is calculated. This calculated rate gain of the actuator $K_{act\ (new)}$ is then used to calculate a $K_{amp\ (new)}$ based upon the calculated $K_{act\ (new)}$ in order to achieve a desired $K_{bw}$. In other words, $K_{bw}/K_{act\ (new)}=K_{amp\ (new)}$. This calculated $K_{amp\ (new)}$ is then added to a predetermined amount of previously calculated $K_{amps\ (new)}$ that were calculated via the same formula $K_{bw}/K_{act\ (new)}=K_{amp\ (new)}$ and wherein the sum of the previously calculated $K_{amps\ (new)}$ is divided by the number of $K_{amps\ (new)}$ calculated in order to provide a weighted $K_{amp}$ or $K_{amp\ new\ weighted}$ which is then stored as $K_{amp}$. In one non-limiting embodiment, the last calculated or oldest $K_{amp\ (new)}$ is removed and replaced with the newly calculated $K_{amp\ (new)}$ and the sum of all of the remaining calculated $K_{amps\ (new)}$ is divided by the predetermined number in order to provide the new updated $K_{amp}$ (box or step 114) which is then stored in the non-volatile memory of the FADEC or EEC 14 (box or step 116). The newly stored $K_{amp}$ is now used to control the valve or actuator 18, which has been dynamically updated to reflect changes in the operational aspects of the valve or actuator 18, which may be attributable to lacquering or coking issues. In the given example, 20 calculations are performed to determine $K_{amp\ new\ weighted}$ by using a moving average of the last 20 (for example) tests, this prevents a sudden change of the control gain. The new EEC gain would be then stored in memory such that it could be used in the next power up of the EEC. Of course, 20 calculations are provided as one non-limiting example of course, greater or less than 20 calculations may be used.

Still further, the recordation or trending of the valve variation may be used to predict or set a threshold for valve replacement. This is illustrated by box, step or decision node 118. If at decision node 118, $K_{amp}$ from box or step 116 is not within a range of the threshold values, the engine electronic control and/or FADEC can indicate that it is time to service or replace the valve 18 at step or box 120. Accordingly, once the percentage of the variation of the valve performance exceeds a threshold, the engine electronic control and/or FADEC may indicate that it is time to service or replace the valve 18 via an indication on a visual display. In one embodiment, the threshold may be a predetermined threshold that is set at the start of the valve's service.

In an exemplary embodiment, the engine electronic control and/or FADEC 14 comprises a microprocessor, microcontroller or other equivalent processing device capable of executing commands of computer readable data or program for executing a control algorithm and/or algorithms that control the start sequence of the gas turbine engine. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. As described above, exemplary embodiments of the disclosure can be implemented through computer-implemented processes and apparatuses for practicing those processes. The system 12 may include memory to store instructions that are executed by a processor. The executable instructions may be stored or organized in any manner and at any level of abstraction, such as in connection with a controlling and/or monitoring operation of the engine 10 of FIG. 1. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored data and control algorithms in a non-transitory form. The system 12 can be embodied in an individual line-replaceable unit, within a control system (e.g., in an electronic engine control), and/or distributed between multiple electronic systems.

A technical effect of the apparatus, systems and methods described herein is achieved by actively calculating a capability of an electronically controlled valve.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of calculating a capability of an electronically controlled valve and operating the electronically controlled valve, comprising:
   a) operating the electronically controlled valve in accordance with a task;
   b) testing the electronically controlled valve in order to determine a range of movement of the electronically controlled valve in accordance with an initial gain that is provided by an engine electronic control, wherein the testing of the electronically controlled valve occurs after the electronically controlled valve has been operated in accordance with the task, recording the initial gain for providing the range of movement of the electronically controlled valve;
   c) determining a new gain required for providing a predetermined range of movement of the electronically controlled valve, wherein the new gain is compared to a predetermined value in order to determine whether the electronically controlled valve is trending towards a threshold value; and
   d) repeating steps a-c at least once, wherein each new gain determined by the repeating steps is used to operate the electronically controlled valve by providing a desired movement of the electronically controlled valve in accordance with the task.

2. The method as in claim 1, wherein the electronically controlled valve is a fuel valve of a gas turbine engine.

3. The method as in claim 1, wherein each new gain determined by repeating steps is an average of a plurality of gains each being a result of the testing of the electronically controlled valve performed in the repeating steps, wherein each one of the testing of the electronically controlled valve determines the range of movement of the electronically controlled valve in accordance with the initial gain, wherein each one of the testing of the electronically controlled valve occurs after the electronically controlled valve has been operated in accordance with the task.

4. The method as in claim 3, wherein the electronically controlled valve is a fuel valve of a gas turbine engine.

5. The method as in claim 1, wherein the threshold value is a speed of the electronically controlled valve that is indicative of a repair.

6. The method as in claim 1, wherein the initial gain is in mA/inch and is applied to a control loop of the electronically controlled valve.

7. A system for operating and actively calculating a capability of an electronically controlled valve, comprising:
   an engine electronic control;
   wherein the engine electronic control is configured to provide an initial gain, wherein the initial gain provides a range of movement of the electronically controlled valve when the initial gain is provided to the electronically controlled valve by the engine electronic control; and
   wherein the engine electronic control is configured to:
      i) operate the electronically controlled valve in accordance with a task;
      ii) test the electronically controlled valve in order to determine a range of movement of the electronically controlled valve in accordance with the initial gain, wherein the testing of the electronically controlled valve occurs after the electronically controlled valve has been operated in accordance with the task;
      iii) record the initial gain;
      iv) determine a new gain required for providing the predetermined range of movement of the electronically controlled valve, wherein the new gain is compared to a predetermined value in order to determine whether the electronically controlled valve is trending towards a threshold value; and
      v) repeat steps i-iv at least once, wherein each new gain determined by the repeated steps is used to operate the electronically controlled valve by providing a desired movement of the electronically controlled valve in accordance with the task.

8. The system as in claim 7, wherein the electronically controlled valve is a fuel valve of a gas turbine engine.

9. The system as in claim 7, wherein each new gain determined by the repeating steps is an average of a plurality of gains each being a result of one of the testing of the electronically controlled valve performed in the repeating steps, wherein each one of the testing of the electronically controlled valve determines the range of movement of the electronically controlled valve in accordance with the initial gain, wherein each one of the testing of the electronically controlled valve occurs after the electronically controlled valve has been operated in accordance with the task.

10. The system as in claim 9, wherein the electronically controlled valve is a fuel valve of a gas turbine engine.

11. The system as in claim 7, wherein the threshold value is a speed of the electronically controlled valve that is indicative of a repair.

12. The system as in claim 7, wherein the initial gain is in mA/inch and is applied to a control loop of the electronically controlled valve.

13. A method of predicting a trend of an electronically controlled valve, and operating the electronically controlled valve, comprising:
   a) recording an initial gain required for providing a predetermined range of movement of the electronically controlled valve;
   b) operating the electronically controlled valve in accordance with a task;
   c) testing the electronically controlled valve in order to determine a range of movement of the electronically controlled valve in accordance with the initial gain, wherein the testing of the electronically controlled valve occurs after the electronically controlled valve has been operated in accordance with the task;
   d) determining a new gain required for providing the predetermined range of movement of the electronically controlled valve;

e) comparing the new gain to a threshold value to determine whether the new gain is greater than the threshold value; and f) repeating steps b-e at least once, wherein the new gain is used to operate the electronically controlled valve by providing a desired movement of the electronically controlled valve in accordance with the task.

14. The method as in claim 13, wherein the initial gain is in mA/inch and is applied to a control loop of the electronically controlled valve.

15. The method as in claim 14, wherein the electronically controlled valve is a fuel valve of a gas turbine engine.

16. The method as in claim 13, wherein the electronically controlled valve is a fuel valve of a gas turbine engine.

17. The method as in claim 13, wherein the threshold value is a speed of the electronically controlled valve that is indicative of a repair.

* * * * *